(12) United States Patent
Wisor

(10) Patent No.: US 6,823,435 B1
(45) Date of Patent: *Nov. 23, 2004

(54) NON-VOLATILE MEMORY SYSTEM HAVING A PROGRAMMABLY SELECTABLE BOOT CODE SECTION SIZE

(75) Inventor: Michael T. Wisor, Austin, TX (US)

(73) Assignee: Advanced Micro Devices, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 995 days.

(21) Appl. No.: 08/974,971

(22) Filed: Nov. 20, 1997

(51) Int. Cl.⁷ ............................................. G06F 12/00
(52) U.S. Cl. ....................... 711/170; 711/103; 712/37; 713/2
(58) Field of Search .................. 711/170, 173, 711/103; 365/185.33; 712/37; 713/1, 2; 714/36

(56) References Cited

U.S. PATENT DOCUMENTS

| | | | | |
|---|---|---|---|---|
| 4,135,240 A | * | 1/1979 | Ritchie | 711/164 |
| 5,375,209 A | * | 12/1994 | Maher et al. | 712/37 |
| 5,696,929 A | * | 12/1997 | Hasbun et al. | 711/103 |
| 5,737,585 A | * | 4/1998 | Kaneshima | 711/103 |
| 5,793,676 A | * | 8/1998 | Bedarida et al. | 365/185.33 |
| 5,802,552 A | * | 9/1998 | Fandrich et al. | 711/103 |
| 5,809,290 A | * | 9/1998 | DeRoo et al. | 713/500 |
| 5,835,760 A | * | 11/1998 | Harmer | 713/2 |
| 5,890,191 A | * | 3/1999 | Espinor et al. | 711/103 |
| 5,892,927 A | * | 4/1999 | Boehmer et al. | 710/100 |
| 5,930,504 A | * | 7/1999 | Gabel | 713/2 |
| 5,937,423 A | * | 8/1999 | Robinson | 711/103 |
| 5,937,434 A | * | 8/1999 | Hasbun et al. | 711/173 |
| 5,961,611 A | * | 10/1999 | Oh | 710/1 |
| 6,009,495 A | * | 12/1999 | DeRoo et al. | 711/103 |

* cited by examiner

*Primary Examiner*—Matthew Kim
*Assistant Examiner*—Woo H. Choi
(74) *Attorney, Agent, or Firm*—Robert C. Kowert; Meyertons, Hood, Kivlin, Kowert & Goetzel, P.C.

(57) ABSTRACT

A non-volatile memory system is presented having a boot code section, wherein the size of the boot code section may be programmably selected. One embodiment of the non-volatile memory system includes a memory array, a logic unit, a control unit, and a program store. The memory array includes multiple non-volatile memory cells (e.g., flash EEPROM cells). The memory array is divided into memory blocks of equal size. A number of the memory blocks are allocated for boot code storage, forming a boot code section of the memory array. The control unit controls storage of data within and retrieval of data from the memory array. The control unit includes a configuration register having a boot code section size field. The contents of the boot code section size field determine the number of memory blocks making up the boot code section. The logic unit is coupled between the control unit and the memory array, and receives address, data, and control signals from an external source. The logic unit provides the address, data, and control signals to the control unit and to the memory array. The program store stores instructions and data which determine the functionality of the control unit. Commands and configuration data are conveyed to the non-volatile memory system using predetermined sequences of bus write cycles. One embodiment of a computer system includes a central processing unit (CPU), and expansion bus, a memory bus, chip set logic, and the non-volatile memory system.

8 Claims, 3 Drawing Sheets

NON-VOLATILE MEMORY SYSTEM HAVING A PROGRAMMABLY SELECTABLE BOOT CODE SECTION SIZE

BACKGROUND OF THE INVENTION

1. Field of Invention

This invention relates to memory systems, and more particularly to non-volatile semiconductor memory devices employed to store bootstrap or "boot" code in a computer system.

2. Description of Related Art

Computer systems typically include hardware dependent software which must be valid when electrical power is applied to the systems. Such software includes instructions which initialize system hardware components (e.g., interrupt controller, direct memory access controller, and serial port) and provide a basic input and output system (BIOS). The BIOS provides an interface between system software and hardware (e.g., core logic chip set, graphics controller, keyboard, and disk drives). Computer system software programs typically access system hardware components using the BIOS.

A typical computer system includes a microprocessor which functions as a central processing unit (CPU). The microprocessor executes instructions stored within a main memory. The main memory typically includes a non-volatile read only memory (ROM) portion and a volatile random access memory (RAM) portion. Only the contents of the ROM portion of the main memory are valid at system power up, and thus the BIOS software is stored within the ROM portion of main memory. When power is applied to the microprocessor, or a RESET signal is asserted, the microprocessor begins fetching and executing instructions at a predetermined location within the main memory. Thus the ROM portion of the main memory includes the memory location where the microprocessor begins fetching and executing instructions. For example, many modem computer systems include x86 microprocessors. When power is applied to an x86 microprocessor, or when the RESET signal is asserted, the x86 microprocessor begins fetching and executing instructions located at the highest possible address in main memory. In such systems, the ROM portion of the main memory is mapped to the uppermost addresses of the main memory.

The BIOS code typically contains bootstrap or "boot" code, which typically constitutes a minimal amount of code necessary to initialize the computer system. The boot code typically verifies the integrity of the BIOS code, checks the functionality of the RAM portion of the main memory, and begins the process of copying operating system software from disk (e.g., floppy disk or hard disk) to the RAM portion of the main memory. Once initialized, the computer system executes programs stored in the RAM portion of the main memory.

BIOS code is often stored within various types of non-volatile ROM devices, including programmable read-only memory (PROM) devices, erasable programmable read only memory (EPROM) devices, and electrically erasable programmable read only memory (EEPROM) devices. EPROM and EEPROM memory devices include floating-gate metal oxide semiconductor (MOS) transistors programmed by adding or removing charge from the floating gate. PROM, EPROM, and EEPROM devices are all programmed electrically. PROM devices typically include fusible links which are "blown" during programming. PROM devices may thus be programmed only once. Programmed EPROM and EEPROM devices, on the other hand, may be erased and reprogrammed. EPROM elements are erased by exposure to ultraviolet (UV) radiation, while EEPROM elements are erased electrically.

In order to take full advantage of sophisticated system hardware components becoming increasingly available, existing BIOS code must often be modified. Unfortunately, the more common ROM devices used to store BIOS software must either be replaced (PROM) or removed from a computer system and reprogrammed in order to be upgraded (EPROM and EEPROM).

Flash memory devices, sometimes called flash EEPROM devices, are rapidly replacing ROM devices in BIOS applications. Like EPROM and EEPROM memory devices, flash memory devices include floating-gate metal oxide semiconductor (MOS) transistors programmed by adding or removing charge from the floating gate, thus providing non-volatile storage. Unlike EPROM and EEPROM devices, however, flash memory devices may be reprogrammed while still in the computer system.

Flash memory devices are typically divided into sections or blocks, and all storage locations within a given block may be electrically erased simultaneously. Auxiliary circuitry is required to manage the erase blocks, and the size and complexity of the auxiliary circuitry increases with the number of erase blocks. Erase block size is often a compromise between cost, which increases with the number of erase blocks, and performance, which decreases with increasing erase block size. A single erase block of a flash memory device is often dedicated to boot code storage. As computer systems cannot operate without boot code, such "boot blocks" are typically protected from erasure by software and/or hardware mechanisms. To a typical user, a boot block is essentially a read-only portion of an otherwise read-write memory unit.

While the number of memory locations required to store boot code varies from computer system to computer system, boot block sizes are typically fixed (e.g., 16 kilobytes or 16 Kbytes). In many systems, the boot code occupies only a small portion of the boot block. As the boot block is protected from erasure, the unused portion of the boot block cannot be used by system software for data storage and retrieval. As a result, a large portion of the boot block goes unused in such systems. It would thus be beneficial to have a flash memory device wherein the size of the protected portion used to store the boot code may be programmably selected.

SUMMARY OF THE INVENTION

The problems outlined above are in large part solved by a non-volatile memory system having a section dedicated for storage of instructions and data used to initialize a central processing unit (i.e., boot code), wherein the size of the boot code section may be programmably selected. The non-volatile memory system of the present invention includes a memory array configured to store data and having a boot code section for boot code storage. The contents of a programmable storage unit (e.g., a portion of a programmable register) determine the number of memory locations within the boot code section (i.e., the size of the boot code section).

One embodiment of the non-volatile memory system includes the memory array, a logic unit, a control unit, and a program store. The memory array includes multiple non-volatile memory cells (e.g., flash EEPROM cells). The memory cells are divided into memory blocks of equal size. All of the memory cells within a given memory block may be erased simultaneously. A number of the memory blocks are allocated for boot code storage, forming the boot code section of the memory array. The control unit is coupled to the memory array, and controls storage of data within and retrieval of data from the memory array. The control unit includes a command register and a configuration register. The command register is used to store one or more commands issued to the non-volatile memory system. The configuration register includes a boot code section size field. The contents of the boot code section size field determine the number of memory blocks making up the boot code section of the memory array. The logic unit is coupled between the control unit and the memory array, and is coupled to receive address, data, and control signals from an external source. The logic unit is configured to provide the address, data, and control signals to the control unit and to the memory array. The program store stores instructions and data which determine the functionality of the control unit.

Commands and configuration data are conveyed from an external source to the non-volatile memory system using predetermined sequences of bus write cycles. The control unit receives the commands and stores the commands within the command register. The control unit also receives configuration data and stores the configuration data within the configuration register. The contents of the command register and the configuration register determine the operation of the control unit.

One embodiment of a computer system of the present invention includes a central processing unit (CPU), and expansion bus, a memory bus, chip set logic, and the non-volatile memory system. The CPU is configured to execute instructions, preferably x86 instructions. The expansion bus is adapted for coupling to one or more peripheral devices. The non-volatile memory unit is coupled to the memory bus. The chip set logic is coupled to the CPU, the expansion bus, and the memory bus. The chip set logic functions as interface between the CPU and the expansion bus, and between the CPU and the non-volatile memory system.

BRIEF DESCRIPTION OF THE DRAWINGS

Other objects and advantages of the invention will become apparent upon reading the following detailed description and upon reference to the accompanying drawings in which.

Figure 1:
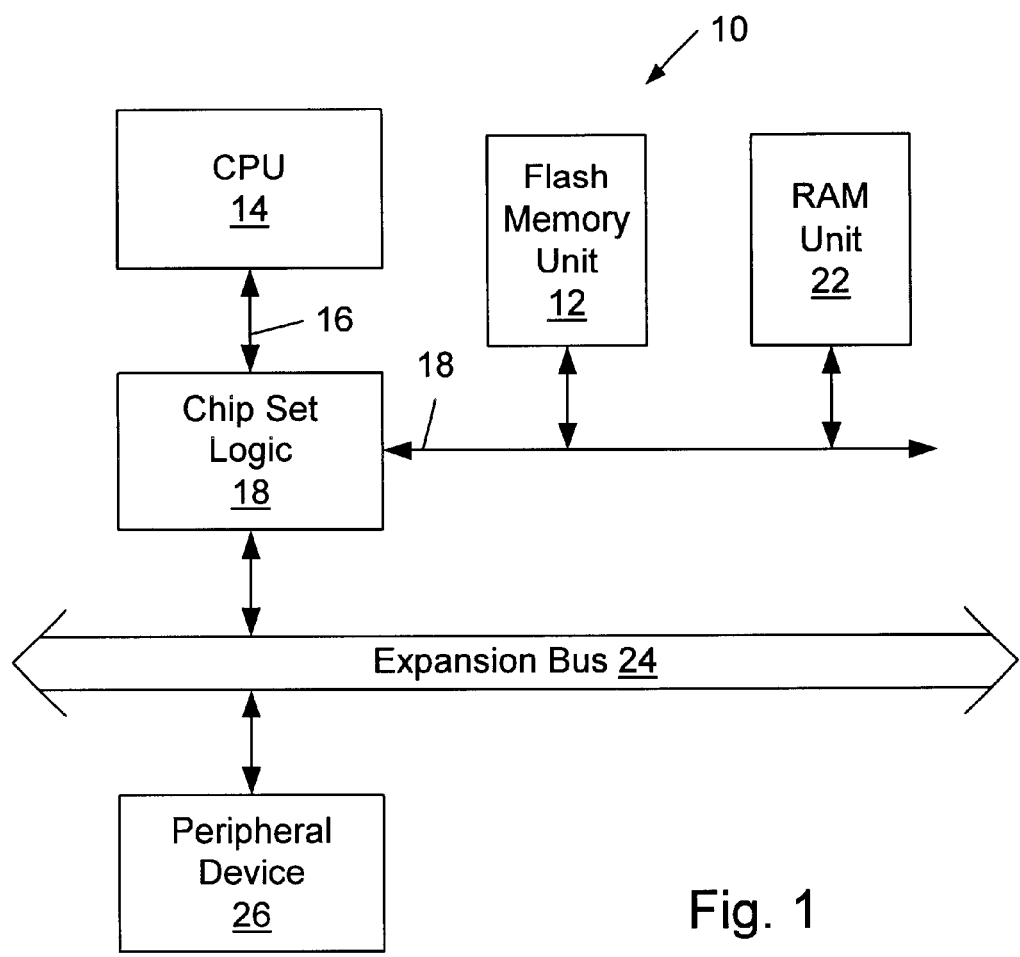
FIG. 1 is a block diagram of one embodiment of a computer system in accordance with the present invention, wherein the computer system includes a flash memory unit.

While the invention is susceptible to various' modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to the figures, FIG. 1 is a block diagram of one embodiment of a computer system 10 in accordance with the present invention. Computer system 10 includes a flash memory unit 12 containing multiple non-volatile memory cells. BIOS code is preferably stored within flash memory unit 12. Flash memory unit 12 may be divided into a number of memory blocks, and a variable number of these memory blocks dedicated for boot code storage. Computer system 10 also includes a CPU 14, a processor bus 16, chip set logic 18, a memory bus 20, a RAM unit 22, and an expansion bus 24. CPU 14 is configured to execute instructions, preferably x86 instructions. Processor bus 16 couples CPU 14 to chip set logic 18. Chip set logic 18 is also coupled to memory bus 20 and expansion bus 24. Flash memory unit 12 and RAM unit 22 are coupled to memory bus 20. Chip set logic 18 functions as interface between CPU 14 and expansion bus 24, between CPU 14 and flash memory unit 12, and between CPU 14 and RAM unit 22. Chip set logic 18 preferably includes a memory controller. CPU 14 obtains instructions and data (i.e., reads) from flash memory unit 12 or RAM unit 22 via chip set logic 18, and stores data (i.e., writes) to flash memory unit 12 or RAM unit 22 via chip set logic 18. Expansion bus 24 is adapted for coupling to one or more peripheral devices. For example, a peripheral device 26 may be coupled to expansion bus 24. Peripheral device 26 may be, for example, a disk drive unit, a video display unit, or a printer. CPU 14 exchanges data (i.e., communicates) with peripheral device 26 via chip set logic 18.

Flash memory unit 12 is configured to store data. Data stored within flash memory unit 12 remains valid even after electrical power is removed from flash memory unit 12. The non-volatile memory cells of flash memory unit 12 are preferably floating-gate metal oxide semiconductor (MOS) transistors programmed by adding or removing charge from the floating gate (i.e., flash EEPROM cells). The non-volatile memory cells of flash memory unit 12 may be programmed while still physically connected to other components of computer system 10.

Figure 2:
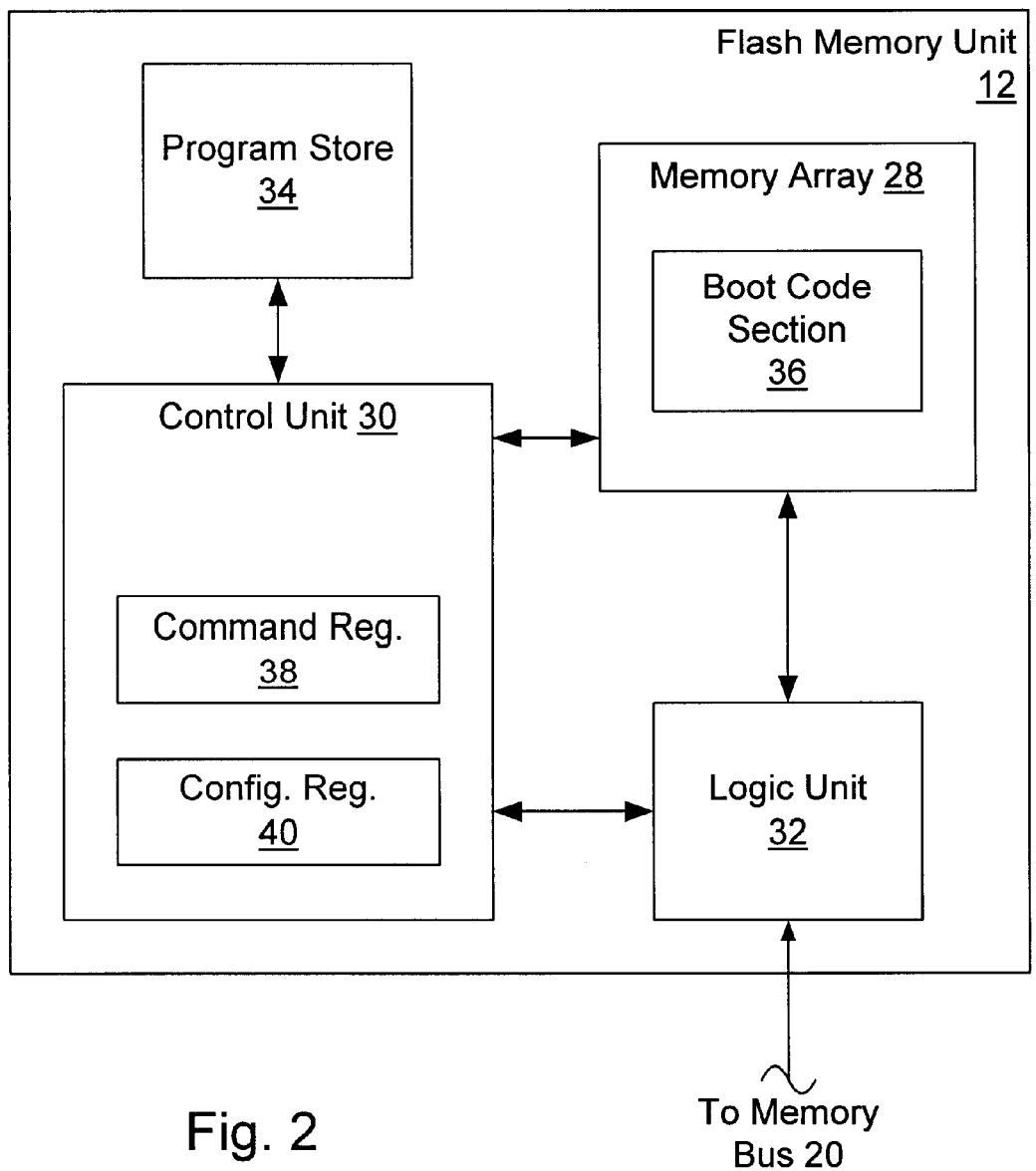
FIG. 2 is a block diagram of one embodiment of the flash memory unit of FIG. 1, wherein the flash memory unit includes a memory array and a control unit, and wherein the memory array includes a boot code section for storing boot code, and wherein the control unit includes a configuration register.

FIG. 2 is a block diagram of one embodiment of flash memory unit 12. Flash memory unit 12 includes a memory array 28, a control unit 30, a logic unit 32, and a program store 34, all formed upon a single monolithic semiconductor substrate. Memory array 28 includes multiple non-volatile memory cells for storing data, preferably flash EEPROM cells. The non-volatile memory cells of memory array 28 are accessed using address signals driven upon the address lines of memory bus 20. Memory array 28 includes a boot code section 36 for storing instructions used to initialize CPU 14 (i.e., boot code).

Control unit 30 is coupled to memory array 28 and configured to control the storage of data within and the retrieval of data from memory array 28. Control unit 30 embodies a state machine which implements read and write operations. Program store 34 is coupled to control unit 30, and is used to store instructions and data (i.e., software) which control the functionality of control unit 30. For example, write operations may involve the erasure of old data stored within one or more of the memory cells of memory array 28, followed by programming of the memory cells to reflect new data. In this case, erase and programming software is stored within program store 34, and control unit 30 implements write operations by executing the erase and programming software.

Logic unit 32 functions as an interface between flash memory unit 12 and memory bus 20. Logic unit 32 is coupled to address, data, and control lines of memory bus 20. Logic unit 32 is also coupled to memory array 28 and to control unit 30. Logic unit 32 includes interface circuitry (e.g., latches and buffers) used to receive address and control signals, and to receive and transmit data signals. Logic unit 32 provides address, data, and control signals received from memory bus 20 to memory array 28 and to control unit 30. Logic unit 32 also drives data retrieved from memory array 28 onto the data lines of memory bus 20.

Control unit 30 includes a command register 38 and a configuration register 40. Command register 38 is used to store one or more commands issued to flash memory unit 12 via memory bus 20. As will be described in more detail below, the contents of configuration register 40 are used to determine the size of boot code section 36. Commands and configuration data are conveyed (i.e., written) to flash memory unit 12 using predetermined sequences of bus write cycles. Control unit 30 is configured to receive commands and to store the commands within command register 38. Control unit 30 is also configured to receive configuration data and to store the configuration data within configuration register 40. The contents of command register 38 and a configuration register 40 determine the operation of control unit 30.

Memory locations within memory array 28 are preferably organized and accessed as units, for example 8-bit bytes. In this case, each byte within memory array 28 has a unique address and constitutes a memory location within memory array 28. Bytes of data are thus stored within and retrieved from flash memory unit 12. Storing a byte of data within a desired memory location of flash memory unit 12 requires programming of the 8 non-volatile memory cells of the memory location.

An example will now be used to describe the issuing of a write (i.e., byte program) command to flash memory unit 12. Four consecutive bus write cycles may be used to convey the byte program command. The first two bus cycles may be predetermined "unlock" write cycles, followed by a third bus write cycle which conveys the byte program command to control unit 30. The fourth bus write cycle may convey the address of the: location within memory array 28 to be programmed and the new data to be stored within that location. For example, the first unlock write cycle may write data 'AAh' to address '5555h', and the second unlock cycle may write data '55h' to address '2AAAh'. This unlock sequence notifies control unit 30 that a valid command is to follow. The third write cycle may write byte program command code 'A0h' to address '5555h'. Upon recognition of the unlock sequence, control unit 30 stores byte program command 'A0h' within command register 38. Contents 'A0h' within command register 38 causes control unit 30 to enter a byte programming mode. The fourth write cycle may write data '05h' to address '1234h'. Control unit 30, executing software stored within program store 34, issues command signals to logic unit 32 and memory array 28 which causes data '05h' to be stored within location '1234h' of memory array 28.

Other commands are issued to flash memory unit 12 in a similar manner. Such predetermined sequences of bus write cycles are also used to convey configuration data to flash memory unit 12. For example, two consecutive unlock write cycles involving different addresses and/or data than the unlock write cycles described above may be used to notify control unit 30 that configuration data is to follow. Following recognition of the predetermined unlock sequence, control unit 30 may store the next byte of information within configuration register 40.

Figure 3:
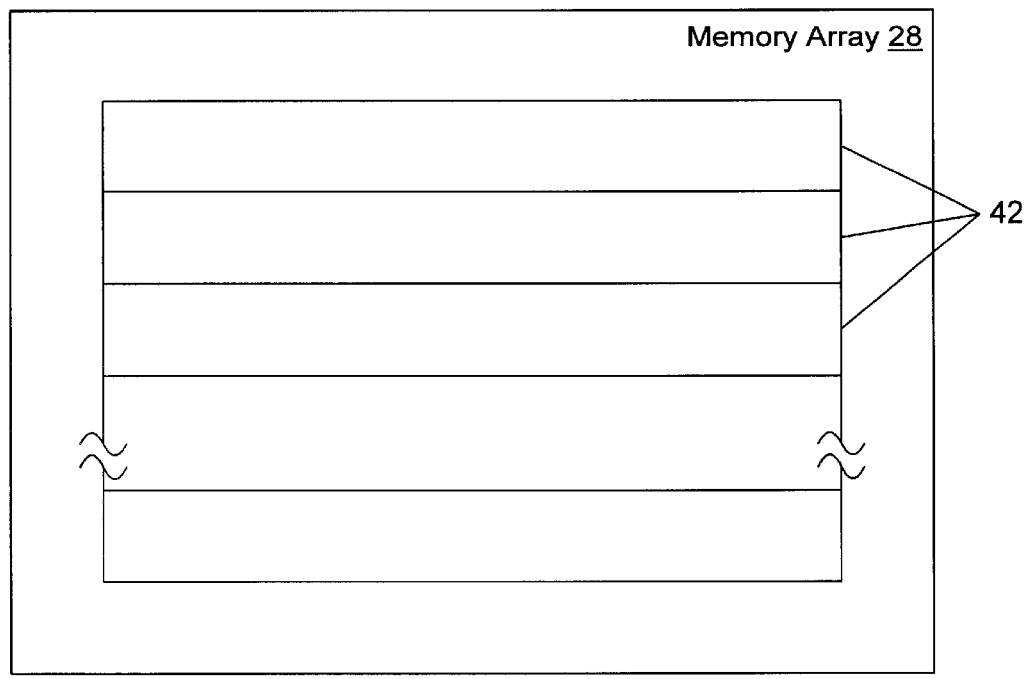
FIG. 3 is a block diagram of one embodiment of memory array of FIG. 2, wherein the memory array is divided into multiple memory blocks.

FIG. 3 is a block diagram of one embodiment of memory array 28. The non-volatile memory cells of memory array 28 are divided into multiple memory blocks 42. All of the memory cells within a given memory block may be erased simultaneously. For example, the non-volatile memory cells of memory array 28 may be organized as bytes as described above, and memory array 28 may be divided into equally-sized memory blocks each having 2,048 (2K) memory locations. A number of these memory blocks may be set aside for boot code storage. These boot code memory blocks collectively form boot code section 36. Boot code section 36 is preferably protected from erasure by software and/or hardware protection mechanisms. Access to boot code section 36 is provided, however, for boot code modification.

Figure 4:
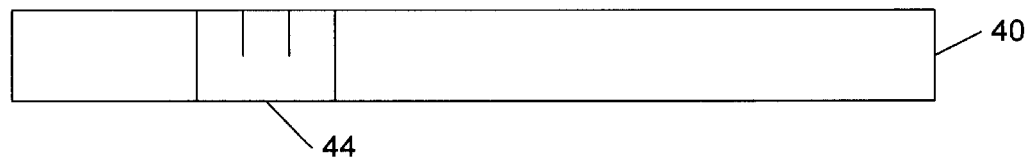
FIG. 4 is a block diagram of one embodiment of the configuration register of FIG. 2, wherein the configuration register includes a boot code section size field, and wherein the contents of the boot code section size determine the size of the boot code section of FIG. 2.

FIG. 4 is a block diagram of one embodiment of configuration register 40. Configuration register 40 includes a boot code section size field 44. Boot code section size field 44 includes multiple bit positions of configuration register 40, and is used to store data conveying the size of boot code section 36. For example, boot code section size field 44 may occupy 3 bit positions of configuration register 40, and may be use to store a binary number representing the number of memory blocks within boot code section 36. If, for example, each memory block contains 2K memory locations, and boot code section size field 44 contains the binary value '011', then the size of boot code section 36 is 3 times 2K or 6K memory locations.

In order to retain boot code section size information even when electrical power is removed from flash memory unit 12, configuration register 40 preferably includes non-volatile memory cells. These non-volatile memory cells are preferably flash EEPROM cells, and are preferably protected from erasure by software and/or hardware protection mechanisms. In order to provide compatibility with flash memory devices which do not include configuration registers, the value stored within boot code section size field 44 when configuration register 40 is erased preferably conveys that boot code section 36 includes 0 bytes. For example, many flash EEPROM cells contain the value '1' when erased, and must be programmed to store a '0' value. In this case, the value '111' stored within boot code section size field 44 when configuration register 40 is erased preferably conveys that boot code section 36 includes 0 bytes. To prevent any confusion, the value '000' stored within boot code section size field 44 may also denote that boot code section 36 includes 0 bytes. Thus the size of boot code section 36 in such a case may vary from 0 bytes to 12K bytes depending upon the value stored within boot code section size field 44 of configuration register 40.

Numerous variations and modifications will become apparent to those skilled in the art once the above disclosure is fully appreciated. It is intended that the following claims be interpreted to embrace all such variations and modifications.

What is claimed is:

1. The non-volatile memory device comprising:
   a memory array comprising a plurality of memory blocks, wherein a boot code section of the memory array is configured to store boot code;

a storage unit, wherein a portion of the storage unit is configured to store information indicating a size of the boot code section; and a control unit configured to control storage of data within and retrieval of data from the memory array, wherein the control unit is further configured to vary the size of the boot code section by modifying the information indicating the size of the boot code section, wherein the control unit is further configured to modify the information in response to receiving a predetermined sequence of bus cycles.

2. A computer system, comprising:

a central processing unit (CPU) configured to execute instructions;

an expansion bus adapted for coupling to one or more peripheral devices;

a memory bus;

chip set logic coupled to the CPU, the expansion bus, and the memory bus; and a non-volatile memory unit coupled to the memory bus, wherein the non-volatile memory unit comprises:

a memory array comprising a plurality of non-volatile memory blocks, wherein a boot code section of the memory array is configured to store boot code used to initialize the CPU;

a configuration register including a boot section size field, wherein the boot section size field is configured to store information indicating a size of the boot code section; and a control unit configured to control storage of data within and retrieval of data from the memory array, wherein the control unit is further configured to vary the size of the boot code section by modifying the information stored in the boot section size field in response to signals on the memory bus.

3. The computer system of claim 2, wherein the signals on the memory bus comprise a predetermined sequence of bus write cycles.

4. The computer system of claim 3, wherein the control unit is further configured to prevent erasure of the boot code section.

5. The computer system of claim 2, wherein a portion of the signals on the memory bus indicate a new size of the boot code section, and wherein the control unit is further configured to modify the information to indicate the new size.

6. The computer system of claim 2, wherein the information indicates the size of the boot code section by indicating a number of the non-volatile memory blocks comprised within the boot code section.

7. The computer system of claim 2, wherein the configuration register is configured so that, if the configuration register is erased, the information indicates that the size of the boot code section is a default size.

8. The computer system of claim 7, wherein the default size is 0 bytes.

* * * * *